L. A. WEST.
FOUNTAIN BRUSH.
APPLICATION FILED DEC. 22, 1916.
1,256,622.
Patented Feb. 19, 1918.
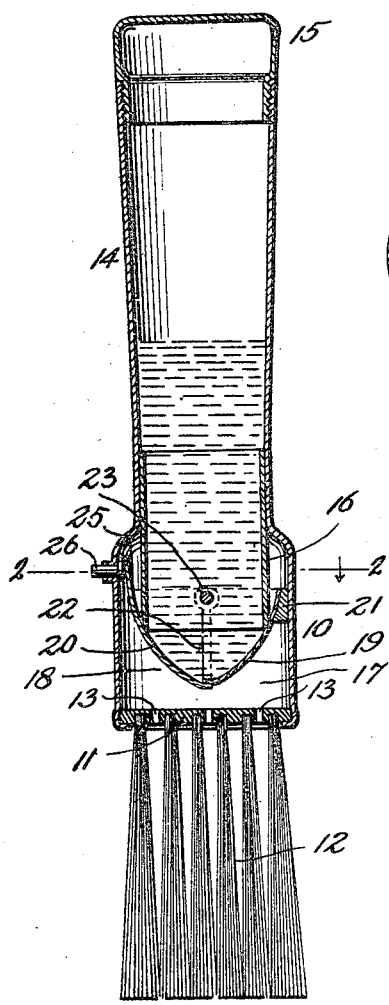
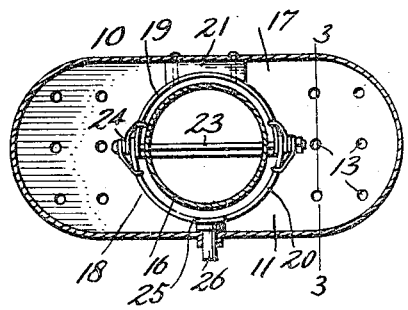
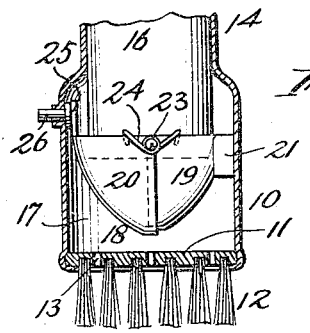
Inventor
Leonard A. West.
Witness
Guy M. Spring
By Richard B. Owen
Attorney

UNITED STATES PATENT OFFICE.

LEONARD A. WEST, OF NIAGARA FALLS, ONTARIO, CANADA.

FOUNTAIN-BRUSH.

1,256,622.  Specification of Letters Patent.  Patented Feb. 19, 1918.

Application filed December 22, 1916. Serial No. 138,416.

*To all whom it may concern:*

Be it known that I, LEONARD A. WEST, a subject of the King of Great Britain and Ireland, residing at Niagara Falls, in the Province of Ontario and Dominion of Canada, have invented certain new and useful Improvements in Fountain-Brushes, of which the following is a specification.

This invention relates to fountain brushes, and has for its object to provide a brush having a chambered head to which the bristles are attached and a hollow handle connected to said head which serves as a reservoir for the liquid to be fed to the brush.

A further object is to provide a suitable valve between the lower end of the handle within the head for controlling the flow of the liquid from the handle into said head and applying to the head a suitable button or pin in convenient position to be operated by a finger while using the brush to open the valve and permit liquid to flow from the handle into the head.

With the above as the principal objects in view the invention consists of the novel construction, combination, and arrangement of parts hereinafter described, pointed out in the appended claims and illustrated in the accompanying drawings, in which—

Figure 1 is a longitudinal sectional view through a fountain brush constructed in accordance with the present invention, Fig. 2 is a horizontal sectional view of the brush on the line 2—2 of Fig 1, and Fig. 3 is a cross sectional view of the brush head on the line 3—3 of Fig. 2.

In the drawings, 10 indicates the brush head made preferably of sheet metal and either of cylindrical or elongated form with parallel sides and open at one end for the insertion thereinto of a block or plate 11 in which are seated the bristles 12 forming the brush, said block or plate having a plurality of perforations 13 therein to permit liquid within the brush head 10 to flow therethrough to the bristles.

The opposite end of the head 10 has attached thereto or formed integral therewith a handle 14 also made preferably of sheet metal and which is made hollow to serve as a receptacle or reservoir for liquid which at the proper time will be permitted to flow to the brush 12. The handle is preferably tapered slightly from the head to its end, being larger at said end and closed by a screw cap 15 which may be removed when the handle is to be filled with the liquid. Attached to the wall of the handle within the same at its lower end is a short cylindrical extension 16 that projects a short distance into the handle and substantially the same distance downwardly into the chamber 17 within the brush head 10, said extension being open at both ends to permit the liquid to flow therethrough.

The lower open end or mouth of the extension 16 is covered to prevent the liquid flowing unrestrainedly therethrough by a valve mechanism 18 which, in the present instance, comprises two leaves 19 and 20 each shaped somewhat in the form of a clam shell, the former being connected immovably at its upper end above the mouth of the extension 16 to a block 21 fixed to a wall of the head 10, or, if desired, directly to said wall. This shell shaped leaf 19 embraces one half of the lower end of the extension 16 and extends below the same, having an edge 22 lying in a vertical plane and curving below the extension 16 as shown. The similarly shaped leaf 20 overlaps the leaf 19 and is pivoted thereto and to the extension 16 by a cross pin 23. This leaf 20 forms a valve which when open permits liquid to flow from the handle 14 into the chamber 17 in the head 10 and thence to the openings 13 to the brush. The valve 20 is maintained in closed position by a spring or springs 24 coiled about one or both ends of the pin and the ends of said coil hooked over the upper edges of the leaves 19, 20. A finger 25 projects upwardly from the center of the valve leaf 20 in position to bear upon a button or pin 26 that projects through an opening in the head 10 near the top thereof and which upon depression by a finger swings the valve 20 to the open position and permits fluid to escape from the handle 14, the quantity flowing therefrom depending upon the width of the opening and the length of time the valve is permitted to remain in this position.

The brush hereinbefore described forms a simple, cheap, and practicable article that may be used for paint, polishing substances such as shoe blacking and stove polish, varnish, and other liquids of like consistency.

What I claim is:

1. A fountain brush comprising a hollow head and a hollow handle leading therefrom, the latter serving as a reservoir for liquid, a brush connected to the opposite end of said head and having openings communicating with said head, an extension from said handle into the hollow head, a fixed clam-shell shaped leaf extending below said extension and half way around the same, a similar leaf forming a movable valve pivoted to the handle extension and adapted to overlap the fixed leaf when in closed position, resilient means for maintaining the valve in closed position, a finger extending upwardly from the movable valve leaf, and a member projecting through the wall of the head and bearing upon said finger for operating the valve.

2. A fountain brush comprising a straight hollow handle adapted to form a reservoir having a closure on one end, an enlargement forming a hollow chamber on the other end of said handle, a perforated brush block closing the open mouth of said chamber, a tubular extension reaching from the handle proper into said chamber and terminating short of the brush block, a swinging valve at the outlet end of said tubular extension to control the flow of liquid from the reservoir handle, a push button projecting outwardly through the chamber for manually opening the valve, and a spring for normally maintaining the valve in closed position.

In testimony whereof I affix my signature in presence of two witnesses.

LEONARD A. WEST.

Witnesses:
WILLIAM A. KERR,
THOMAS BOOTH.

Copies of this patent may be obtained for five cents each, by addressing the "Commissioner of Patents, Washington, D. C."